(No Model.) 2 Sheets—Sheet 1.
J. A. HOGG & H. G. GREEN.
POTATO DIGGER.
No. 489,650. Patented Jan. 10, 1893.
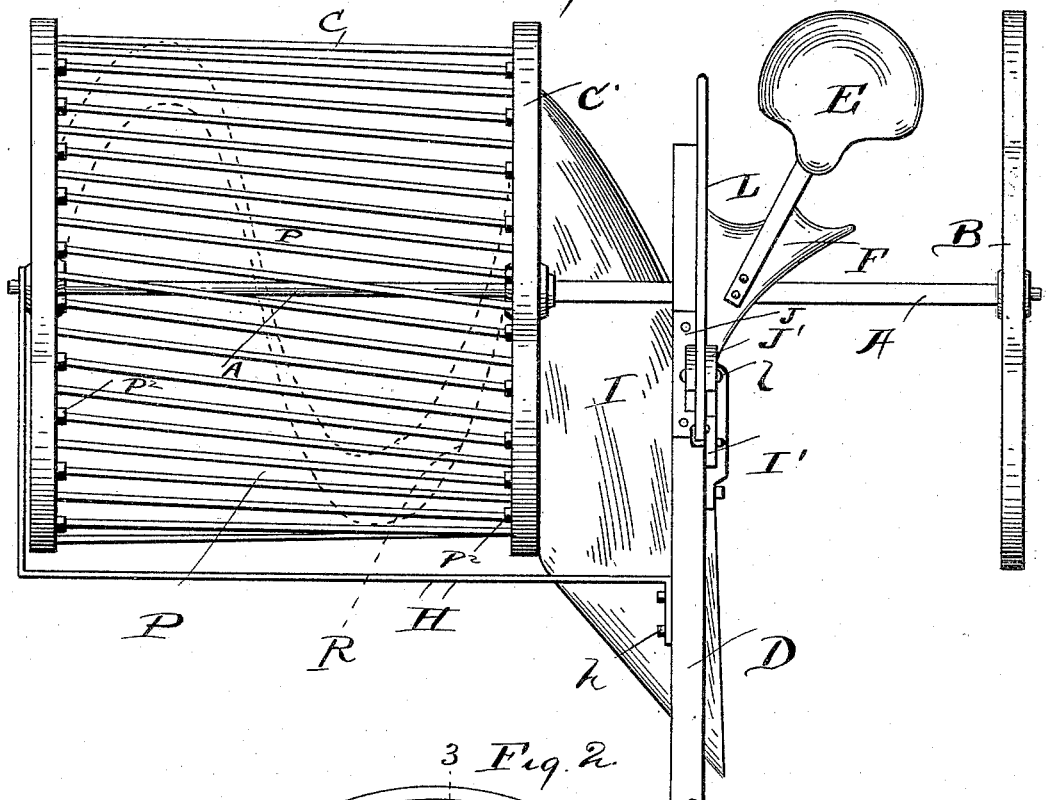
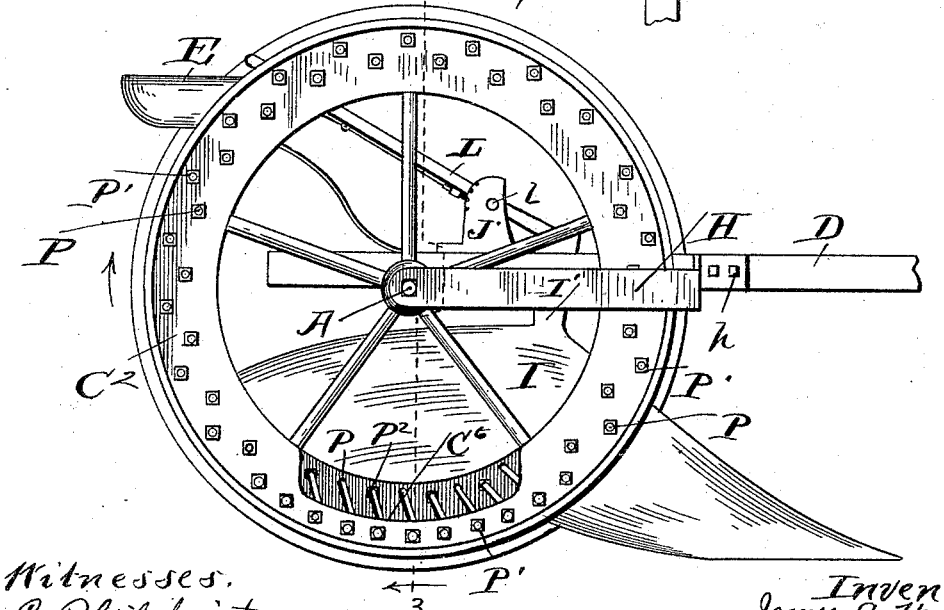
Witnesses.
E. B. Gilchrist.
C. H. Dorey
Inventors
James A. Hogg &
Harvey G. Green.
By Leggett & Leggett
his Attorneys.

(No Model.) 2 Sheets—Sheet 2

J. A. HOGG & H. G. GREEN.
POTATO DIGGER.

No. 489,650. Patented Jan. 10, 1893.

Witnesses:
E. B. Gilchrist.

Inventors
James A. Hogg.
Harvey G. Green
By Leggett & Leggett
Their Attorneys.

UNITED STATES PATENT OFFICE.

JAMES A. HOGG, OF INDEPENDENCE, AND HARVEY G. GREEN, OF CLEVELAND, OHIO.

POTATO-DIGGER.

SPECIFICATION forming part of Letters Patent No. 489,650, dated January 10, 1893.

Application filed May 16, 1892. Serial No. 433,185. (No model.)

*To all whom it may concern:*

Be it known that we, JAMES A. HOGG, of Independence township, and HARVEY G. GREEN, of Cleveland, in the county of Cuyahoga, State of Ohio, have invented certain new and useful Improvements in Potato-Diggers; and we do hereby declare the following to be a full, clear, and exact description of the invention, such as will enable others skilled in the art to which it pertains to make and use the same.

Our invention relates to improvements in potato-diggers wherein is provided a combined plow and scoop whereby the potatoes are loosened in the soil and elevated and discharged into a rotating cage or screen in which the potatoes are separated from the soil adhering thereto or mixed therewith; and our invention consists more especially in certain features of construction and in combination of parts hereinafter described and pointed out in the claims, the object being to simplify the construction and increase the efficiency of machines for the purpose indicated.

Figure 3:
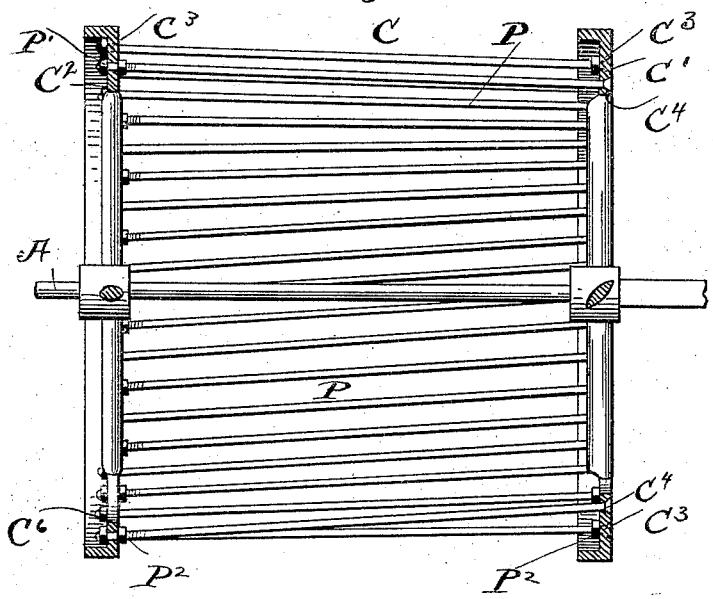
Figure 4:
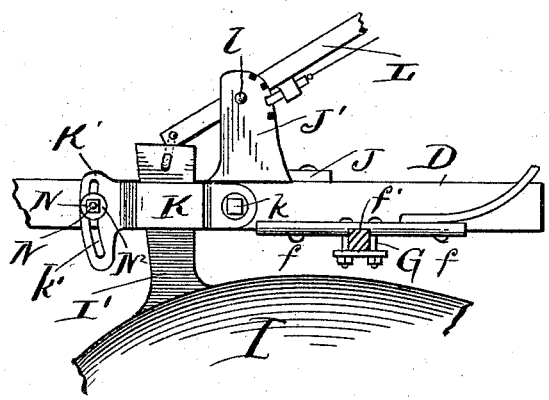

In the accompanying drawings, Figure 1 is a top plan of a potato-digger embodying our invention. Fig. 2 is a left hand side elevation of the same. Fig. 3 is a vertical section of the rotating cage or screen C, on line 3—3, Fig. 2, looking in the direction of the arrow. Fig. 4 is a side elevation of mechanism whereby the plow may be tilted vertically at different angles as required in ascending and descending or working upon a hillside.

A represents the axle of the machine; B the large wheel rotatably mounted upon one end of the axle, and C a rotary screen or cage loosely mounted upon the opposite end of the axle.

D represents the draft-pole and E the seat for the operator, the latter being rigidly secured in any suitable manner to a supporting-plate or member F that rests upon the axle and is secured to the under side of the draft-pole, for instance, by means of bolts $f$. The axle, in turn, is secured to member F by means of a clip or strap, G, and plate or member F is recessed, as at $f'$, to partly embrace the axle, (that is square in cross section as shown) and thereby, in conjunction with strap or clip G, prevent the turning or twisting of the axle.

The end of axle A that extends outside of rotating-cage or screen C is supported by means of a frame, H, that is arranged as shown and secured to draft-pole D, as at $h$, the draft-pole, of course, being located between screen or cage C and large wheel B as shown.

I represents the combined plow and scoop arranged underneath the axle and draft-pole, the same being provided with an arm or member, I', that extends or projects upwardly through a strap or clip K pivotally secured to draft-pole D, as at $k$, the upper end of arm or member I' having suitably attached a lever L for elevating and lowering the plow, as required, to work in small hills or elevations and hollows or depressions in the soil, and to evade obstructions, such, for instance, as stones, lever L being fulcrumed, as at $l$, between upwardly-extending ears J' of a plate J that is rigidly secured to the top of draft-pole D. Suitable mechanism is preferably provided for locking lever L in position holding plow I at any desired elevation, but as there is a great variety of well-known locking-devices suitable for the purpose, it is not considered necessary to describe the same.

Strap or clip K is pivotally secured to the draft-pole as hereinbefore indicated, and its opposite end is enlarged, as at K', said enlarged end being provided with a slot $k'$ concentric with the pivotal bearing of said strap or clip.

N represents a stud-bolt secured to the draft-pole, the same extending through slot $k'$ in strap or clip K and being provided, outside of said clip or strap with a nut N' by tightening which the clip or strap is securely held in its adjusted position, a washer, $N^2$, being preferably interposed between said nut and the clip or strap.

The parts being adjusted to work upon a level plane and it being desired to next work on a hillside or ascend or descend a hillside, by the construction hereinbefore described, it is merely necessary to loosen nut N' whereupon clip or strap K can be swung upon its pivot and the plow or scoop tilted at the angle required, and then secured in such position by re-tightening nut N'.

Referring to the construction of the rotating-screen or cage C, it will be observed that the same comprises two wheels, C' C², the rims whereof are connected by rods or rounds P that are arranged in series concentric with the axis of the rotating-cage or screen, and plow I is so formed and its arrangement and location relative to the receiving end of cage C is such that it will dig and scoop up the potatoes and adhering soil and discharge the same into the cage through the space between spokes of wheel C' at the inner end of the cage or screen, rods or rounds P being arranged at such intervals that the intervening spaces will permit the escape of the soil but the potatoes will be retained, and upon reference to Figs. 1 and 3 of the drawings, it will be observed that said rods or rounds, are arranged oblique to a plane radial with the axis of the cage in such a manner that said rods or rounds upon the ascending side, during the revolution of the same, will be located lower at the delivering-end of said cage than at the receiving end of the cage, as shown more clearly in Fig. 3, by which construction the conveyance of the potatoes from the receiving to the delivering-end of the rotating-cage or screen is greatly facilitated.

A preferable construction of rotating cage C is shown in Fig. 3, wherein the rims of wheels C' C², that form the ends of the cage, are composed of annular plates or members of an inverted L-shape in cross-section, and members C³ of said inverted L-shaped rims, that are radial with the axes of the wheels, are perforated, as at C⁴, for the insertion of rods or rounds P, holes or perforations C⁴ in member C³ of the rim of wheel C' being countersunk to receive the correspondingly-shaped end or head of said rods or rounds flush with the outer side of said member of the rim, thereby enabling the cage to be placed as near as practicable to the scooping-plow. The opposite ends of rounds or rods P extend through and outside of the radial member of the rim of wheel C² and are screw-threaded at said end for the reception of nuts P', tightly against the rim of the wheel.

To securely hold and brace wheels C' C² apart the connecting rods or rounds, P, are screw-threaded at one or both ends just inside the inner surface of members C³ of wheels C' C² and nuts P² are mounted upon said last-mentioned screw-threaded portions of the rods or rounds tightly against members C³.

As shown more clearly in Fig. 2, rounds or rods P are arranged in two series concentric with the axis of rotating-cage C, with the rounds or rods of the inner series arranged preferably midway between the rods or rounds of the outer series. By this zigzag arrangement of rods or rounds P, the soil adhering to and mixed with the potatoes is more thoroughly broken and screened from the potatoes.

By the construction thus far described the potatoes would be delivered from the cage in a continuous stream.

To enable the rotating-cage to discharge a batch or pile of potatoes at intervals and not deliver them in a continuous stream we cut away a portion of the radial member C³ of the rim of the outer end or wheel of the cage, namely,—that portion of the radial member of said rim between two adjacent spokes of the outer wheel, as at C⁶, by which construction a batch or pile of potatoes is delivered by the cage with each rotation of the same. The outer ends of rods or rounds P, that is, the ends at the delivering end of the rotating-cage or screen, are located nearer the periphery of the wheel to which they are secured than the opposite ends of said rods or rounds, giving the cage or screen a slightly conical appearance and causing the rods or rounds as they approach nearest the soil during the rotation of the cage or screen, to decline toward the delivering end of the cage, thereby facilitating the passage of the potatoes from the machine. Slot or discharging-opening C⁶, in member C³ of the rim of wheel C², of cage C, of course necessitates the lowering of the outer or adjacent ends of the rods or rounds of the inner series of rods or rounds P that come within said slot, and hence, as shown very clearly in the drawings said ends of the rods or rounds under consideration are secured in the same or approximately the same circular plane with the rods or rounds in the outer series of rods or rounds, and an advantage in the construction just described consists in that the pitch of the rods or rounds, whose outer ends are thus lowered, toward the discharging-slot, is increased, thereby to that extent facilitating the discharge of the potatoes from the screen or cage.

The spokes of wheel C' at the receiving-end of the cage, as shown in Fig. 3, are preferably set oblique to the hub of the wheel in such a manner that they will offer the least obstruction to the incoming potatoes.

To assist in conducting the potatoes in batches or piles through the cage, a continuous blade R (shown in dotted lines Fig. 1,) may be provided, the same extending from the receiving end of the cage or screen spirally about the cage to the discharging-slot of the same, and secured in any suitable manner to the wheels at the ends of the cage.

What we claim is:—

1. In a potato-digger, a rotating-cage or screen composed of wheels and rods or rounds connecting said wheels, said rods or rounds being arranged oblique to a plane radial with the axis of the cage or screen, substantially as indicated, whereby said rods or rounds will decline toward the delivering-end of the cage or screen on the ascending side of the latter, substantially as and for the purpose set forth.

2. In a potato-digger, a rotating-cage or screen composed of wheels connected by rods or rounds near their periphery, said rods or rounds being arranged in two series concentric with each other, with the rods or rounds of the one series intervening between the rods or rounds of the other series, substantially as and for the purpose set forth.

3. In a potato-digger, a rotating-cage or screen composed of wheels connected by rods or rounds near their periphery, said rods or rounds being secured nearer to the periphery of the wheel at the delivering-end of the cage than to the periphery of the wheel at the opposite end of the cage, substantially as and for the purpose set forth.

4. In a potato-digger, a rotating-cage or screen composed of wheels $C'$ $C^2$, the rims whereof in cross-section, are of the shape of an inverted L, and rounds or rods connecting said wheels and secured to the radial portions of the inverted-L-shaped rims of the wheels, the radial member of the rim of the wheel at the delivering or discharging-end of the cage being cut away, as at $C^6$, substantially as and for the purpose set forth.

5. In a potato-digger, a rotating-cage or screen composed of wheels, $C'$ $C^2$, the rims whereof in cross-section are of the shape of an inverted L, and two concentric series of rods or rounds, arranged substantially as indicated and connecting said wheels, said rounds or rods being secured to the radial portion of the inverted-L-shaped rims of said wheels, the radial member of the rim at the discharging-end of the cage being slotted or cut away, as at $C^6$, and the rounds or rods of the inner series of rods or rounds that are located between the ends of said slot being secured nearer to the periphery of the wheel at the discharging-end of the cage than to the periphery of the wheel at the opposite end of the cage, substantially as and for the purpose set forth.

6. In a potato-digger, a rotating-cage or screen composed of wheels $C'$ $C^2$ and rods or rounds connecting said wheels, said rods arranged in concentric series the parts being rigidly secured together substantially as shown and for the purpose specified.

7. In a potato-digger, in combination with the draft-pole, and the axle, A, of a plate, as at F, bolted to the draft-pole and supporting the seat, said plate being recessed, as at $f'$ to partially embrace the axle, and a clip or strap, G, substantially as and for the purpose set forth.

8. In a potato-digger, the combination with the draft-pole and the plow, of a clip or strap pivoted to the draft-pole, the plow having an arm or member extending upwardly through said clip or strap and a lever, as at L, attached to said arm, the arrangement of parts being such that the plow may be tilted vertically in the one direction or the other according to the direction in which the clip or strap is turned, and suitable means for securing said clip or strap in the desired adjustment of the parts, substantially as set forth.

9. In a potato-digger, the combination with the draft-pole and the plow, of a clip or strap pivotally connected to the one side of the draft-pole and provided with a slot, as at $k'$, concentric with the pivot, the draft-pole being provided with a stud-bolt extending through said slot, a nut mounted on said bolt outside the clip or strap, the plow having an arm or member extending upwardly through said clip or strap, and a lever attached to said arm, all substantially as and for the purpose set forth.

In testimony whereof we sign this specification, in the presence of two witnesses, this 19th day of March, 1892.

JAMES A. HOGG.
HARVEY G. GREEN.

Witnesses:
C. H. DORER,
WARD HOOVER.